(12) United States Patent
Ngo et al.

(10) Patent No.: US 12,086,088 B2
(45) Date of Patent: *Sep. 10, 2024

(54) MULTICHIP PACKAGE WITH PROTOCOL-CONFIGURABLE DATA PATHS

(71) Applicant: Altera Corporation, San Jose, CA (US)

(72) Inventors: Huy Ngo, San Jose, CA (US); Keith Duwel, San Jose, CA (US); David W. Mendel, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/306,100

(22) Filed: Apr. 24, 2023

(65) Prior Publication Data

US 2023/0289309 A1   Sep. 14, 2023

Related U.S. Application Data

(63) Continuation of application No. 17/711,860, filed on Apr. 1, 2022, now Pat. No. 11,669,479, which is a continuation of application No. 17/131,474, filed on Dec. 22, 2020, now Pat. No. 11,294,842, which is a continuation of application No. 16/436,771, filed on Jun. 10, 2019, now Pat. No. 10,884,964, which is a continuation of application No. 14/975,270, filed on Dec. 18, 2015, now Pat. No. 10,394,737.

(51) Int. Cl.
*G06F 13/40* (2006.01)
*G06F 5/06* (2006.01)
*G06F 13/42* (2006.01)

(52) U.S. Cl.
CPC .......... *G06F 13/4022* (2013.01); *G06F 5/065* (2013.01); *G06F 13/4018* (2013.01); *G06F 13/4291* (2013.01); *G06F 2205/067* (2013.01)

(58) Field of Classification Search
CPC ... G06F 13/4022; G06F 5/065; G06F 13/4018
See application file for complete search history.

(56) References Cited

U.S. PATENT DOCUMENTS

| | | |
|---|---|---|
| 7,379,467 B1 | 5/2008 | Paul et al. |
| 10,394,737 B1 | 8/2019 | Ngo et al. |
| | (Continued) | |

*Primary Examiner* — Zachary K Huson
(74) *Attorney, Agent, or Firm* — Fletcher Yoder, P.C.

(57) ABSTRACT

Integrated circuit packages with multiple integrated circuit dies are provided. A multichip package may include a substrate, a main die that is mounted on the substrate, and multiple transceiver daughter dies that are mounted on the substrate and that are coupled to the main die via corresponding Embedded Multi-die Interconnect Bridge (EMIB) interconnects formed in the substrate. Each of the main die and the daughter dies may include configurable adapter circuitry for interfacing with the EMIB interconnects. The adapter circuitry may include FIFO buffer circuits operable in a 1× mode or 2× mode and configurable in a phase-compensation mode, a clock-compensation mode, an elastic mode, and a register bypass mode to help support a variety of communications protocols with different data width and clocking requirements. The adapter circuitry may also include boundary alignment circuitry for reconstructing (de)compressed data streams.

20 Claims, 10 Drawing Sheets

(56) References Cited

U.S. PATENT DOCUMENTS

| | | |
|---|---|---|
| 10,884,964 B2 | 1/2021 | Ngo et al. |
| 11,294,842 B2 | 4/2022 | Ngo et al. |
| 11,669,479 B2 * | 6/2023 | Ngo .................... G06F 13/4291 |
| | | 710/105 |
| 2008/0013609 A1 | 1/2008 | Daxer et al. |
| 2011/0060894 A1 | 3/2011 | Graef |

* cited by examiner

| FIFO CONFIGURATION MODE | |
|---|---|
| 1 | Phase-Compensation |
| 2 | Clock-Compensation |
| 3 | Elastic |
| 4 | Register |

⋮

MULTICHIP PACKAGE WITH PROTOCOL-CONFIGURABLE DATA PATHS

CROSS-REFERENCE TO RELATED APPLICATIONS

This application is a continuation of U.S. patent application Ser. No. 17/711,860, filed Apr. 1, 2022, entitled, "MULTICHIP PACKAGE WITH PROTOCOL-CONFIGURABLE DATA PATHS," which is a continuation of U.S. patent application Ser. No. 17/131,474, filed Dec. 22, 2020, now U.S. Pat. No. 11,294,842, entitled, "MULTICHIP PACKAGE WITH PROTOCOL-CONFIGURABLE DATA PATHS," which is a continuation of U.S. patent application Ser. No. 16/436,771, filed Jun. 10, 2019, now U.S. patent Ser. No. 10/884,964, entitled, "MULTICHIP PACKAGE WITH PROTOCOL-CONFIGURABLE DATA PATHS," which is a continuation of U.S. patent application Ser. No. 14/975,270, filed Dec. 18, 2015, now U.S. Pat. No. 10,394,737, entitled "MULTICHIP PACKAGE WITH PROTOCOL-CONFIGURABLE DATA PATHS," the disclosures of which are incorporated by reference in their entireties for all purposes.

BACKGROUND

This relates generally to integrated circuit packages, and more particularly, to integrated circuit packages with more than one integrated circuit die.

An integrated circuit package typically includes an integrated circuit die and a substrate on which the die is mounted. The die can be coupled to the substrate through bonding wires or solder bumps. Signals from the integrated circuit die may then travel through the bonding wires or solder bumps to the substrate.

As demands on integrated circuit technology continue to outstrip even the gains afforded by ever decreasing device dimensions, more and more applications demand a packaged solution with more integration than possible in one silicon die. In an effort to meet this need, more than one die may be placed within a single integrated circuit package (i.e., a multichip package). As different types of devices cater to different types of applications, more dies may be required in some systems to meet the requirements of high performance applications. Accordingly, to obtain better performance and higher density, an integrated circuit package may include multiple dies arranged laterally along the same plane or may include multiple dies stacked on top of one another.

Emerging trends that would rely on the advantages offered by multichip packages include increasing demands of data centers, the explosion of Internet of Things (IoT), 400G to terabit networking, optical transport, 5G wireless technology, 8K video streaming, etc. These next generation platforms require semiconductor systems that offer higher bandwidth, increased functionality, and increased flexibility while minimizing power consumption and maintaining or reducing its footprint/form factor. These requirements present fairly challenging problems to the system designer.

Conventional multichip packages include multiple dies mounted on an interposer substrate. The use of interposer substrates are, however, oftentimes prohibitively costly to manufacture while also being prone to mechanical issues such as warpage. Interposers sometimes include logic routing fabric for interconnecting the different dies, oftentimes resulting in much longer interconnects, which increases the loading on the driver buffers and limits performance. Moreover, conventional multichip packages that are used in high-speed networking systems (e.g., networking applications that support data transfers of 10 Gbps or more) often have limited flexibility and can only support a single networking protocol.

It is within this context that the embodiments described herein arise.

SUMMARY

A multichip package that includes at least a first integrated circuit (IC) die (e.g., a main programmable integrated circuit die) coupled to a second IC die (e.g., a auxiliary transceiver die) via Embedded Multi-die Interconnect Bridge (EMIB) interconnects is provided. In accordance with an embodiment, the first integrated circuit die may include configurable adapter circuitry that supports a variety of different communications protocols having different data width requirements.

The configurable adapter circuitry on the first IC die may include a first FIFO (first-in first-out) circuit (e.g., a transmit FIFO buffer circuit) having a first data port that supports a fixed data width and a second data port that supports an adjustable data width. The first FIFO circuit has a read clock input that receives a read clock signal and a write clock input that receives a write clock signal. The first FIFO circuit is operable in a first (1×) mode in which the read and write clock signals have identical frequencies and in a second (2×) mode in which the read and write clock signals have different frequencies.

The configurable adapter circuitry may further include a second FIFO circuit (e.g., a receive FIFO buffer circuit) having a first data port that supports the fixed data width and a second data port that supports the adjustable data width. The second FIFO circuit is also operable in the first and second modes.

The second integrated circuit die may also be provided with additional configurable adapter circuitry that includes a third FIFO circuit having a first data port that supports the fixed data width and a second data port that supports the adjustable data width and a fourth FIFO circuit having a first data port that supports the fixed data width and a second data port that supports the adjustable data width. The third and fourth FIFO circuits are also operable in the first and second modes.

When the first integrated circuit die is operated in the first mode, the second data ports of the first and second FIFO circuits are configured to support the fixed data width. When the first integrated circuit die is operated in the second mode, the second data ports of the first and second FIFO circuits are configured to support an adjusted data width that is at least two times greater than the fixed data width. When the second integrated circuit die is operated in the first mode, the second data ports of the third and fourth FIFO circuits are configured to support the fixed data width. When the second integrated circuit die is operated in the second mode, the second data ports of the third and fourth FIFO circuits are configured to support an adjusted data width that is at least two times greater than the fixed data width.

During a first period, the first and second integrated circuit dies may be simultaneously operated in the first mode. During a second period that is different than the first period, the first and second integrated circuit dies may be simultaneously operated in the second mode. During a third period that is different than the first and second periods, the first integrated circuit die may be operated in different modes (e.g., the first IC die may be operated in the first mode while the second integrated circuit die is operated in the second mode, and vice versa).

The FIFO circuits are also configurable in a phase-compensation mode that provides phase compensation for the write and read clock signals controlling the FIFO circuits, a clock-compensation mode that provides clock frequency compensation for the write and read clock signals only during the second mode, an elastic mode that throttles the amount of data being conveyed through the FIFO circuits, and a register mode that selectively bypassed one or more of the FIFO circuits.

Further features of the present invention, its nature and various advantages will be more apparent from the accompanying drawings and the following detailed description.

DETAILED DESCRIPTION

Figure 1:
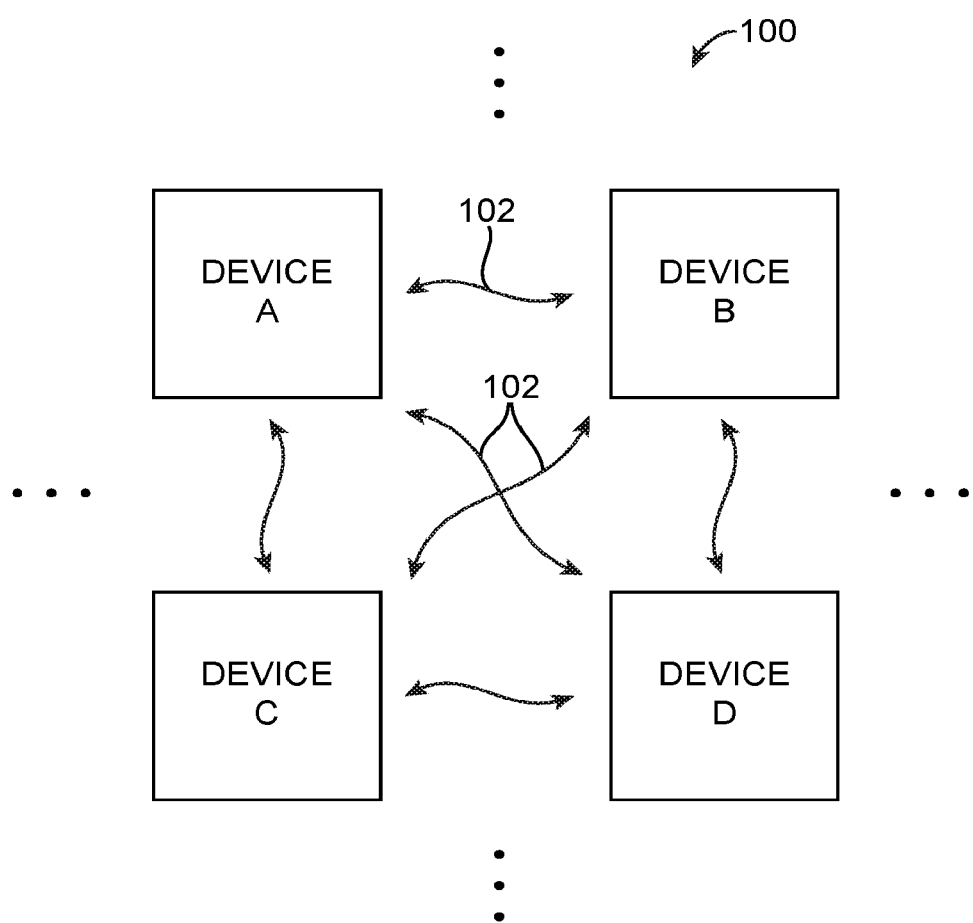
FIG. 1 is a diagram of an illustrative system of integrated circuit devices operable to communicate with one another in accordance with an embodiment.

Embodiments of the present invention relate to integrated circuits, and more particularly, to ways of supporting synchronous data path transfer between multiple dies within a multichip package.

As integrated circuit fabrication technology scales towards smaller process nodes, it becomes increasingly challenging to design an entire system on a single integrated circuit die (sometimes referred to as a system-on-chip). Designing analog and digital circuitry to support desired performance levels while minimizing leakage and power consumption can be extremely time consuming and costly.

One alternative to single-die packages is an arrangement in which multiple dies are placed within a single package. Such types of packages that contain multiple interconnected dies may sometimes be referred to as systems-in-package (SiPs), multi-chip modules (MCM), or multichip packages. Placing multiple chips (dies) into a single package may allow each die to be implemented using the most appropriate technology process (e.g., a memory chip may be implemented using the 28 nm technology node, whereas the radio-frequency analog chip may be implemented using the 45 nm technology node), may increase the performance of die-to-die interface (e.g., driving signals from one die to another within a single package is substantially easier than driving signals from one package to another, thereby reducing power consumption of associated input-output buffers), may free up input-output pins (e.g., input-output pins associated with die-to-die connections are much smaller than pins associated with package-to-board connections), and may help simplify printed circuit board (PCB) design (i.e., the design of the PCB on which the multi-chip package is mounted during normal system operation).

Consider a scenario in which a multichip package includes a first integrated circuit (IC) die and a second IC die mounted on a common substrate. The first and second IC dies may be attached to the substrate in a flip-chip orientation in which a finite number of solder bumps are formed between the IC dies and the substrate. Each solder bump is connected to a corresponding input/output (IO) pin on the first IC die and a corresponding IO pin on the second IC die. Due to area constraints, a single communications channel may include only a finite number of IO pins.

For example, a single channel may have only eighty pins that can be used for synchronous data path transfer. In this scenario, a first group of forty pins can be used for transmission while a second group of forty pins can be used for reception (i.e., only forty pins per direction are available in each channel). This limitation might be tolerable if the channel can support the required data transfer requirement at the system clock rate of either the first or second IC die. However, certain communications protocols will require a higher data transfer criteria that cannot be supported by only forty pins operating at the system clock rate.

In accordance with embodiments of the present invention, circuitry is provided that can be used to transfer data synchronously between IC dies in a multichip package and that can be configured to support a variety of different communications protocols with different data path width requirements and/or frequency requirements. The circuitry may include adapter circuitry that includes configurable buffer circuits (e.g., first-in first-out circuits) that are operable in a normal "1×" mode for supporting relatively lower data transfer rates (e.g., to support protocols that do not require more than the available number of IO pins per channel) and a (de)compression "2×" mode for supporting relatively higher data transfer rates (e.g., to support protocols that required more than the available number of IO pins per channel).

Depending on the requirements of the particular protocol that the system is currently supporting, the buffer circuits can be configured in at least a phase compensation mode that handles read/write operations using clocks with different phases, a clock compensation mode that handles read/write operations using clocks with different frequencies, an elastic mode that helps prevent buffer overflow and underflow, and a register mode that provides reduced latency.

The adaptive circuitry described above may be use as an interface between one or more integrated circuit dies in a system. FIG. 1 is a diagram of an illustrative system 100 of interconnected electronic devices. The system of interconnected electronic devices may have multiple electronic devices such as device A, device B, device C, device D, and interconnection resources 102. Interconnection resources 102 such as conductive lines and busses, optical interconnect infrastructure, or wired and wireless networks with optional intermediate switching circuitry may be used to send signals from one electronic device to another electronic device or to broadcast information from one electronic device to multiple other electronic devices. For example, a transmitter in device B may transmit data signals to a receiver in device C. Similarly, device C may use a transmitter to transmit data to a receiver in device B.

The electronic devices may be any suitable type of electronic device that communicates with other electronic devices. Examples of such electronic devices include basic electronic components and circuits such as analog circuits, digital circuits, mixed-signal circuits, circuits formed within a single package, circuits housed within different packages, circuits that are interconnected on a printed-circuit board (PCB), etc.

Figure 2:
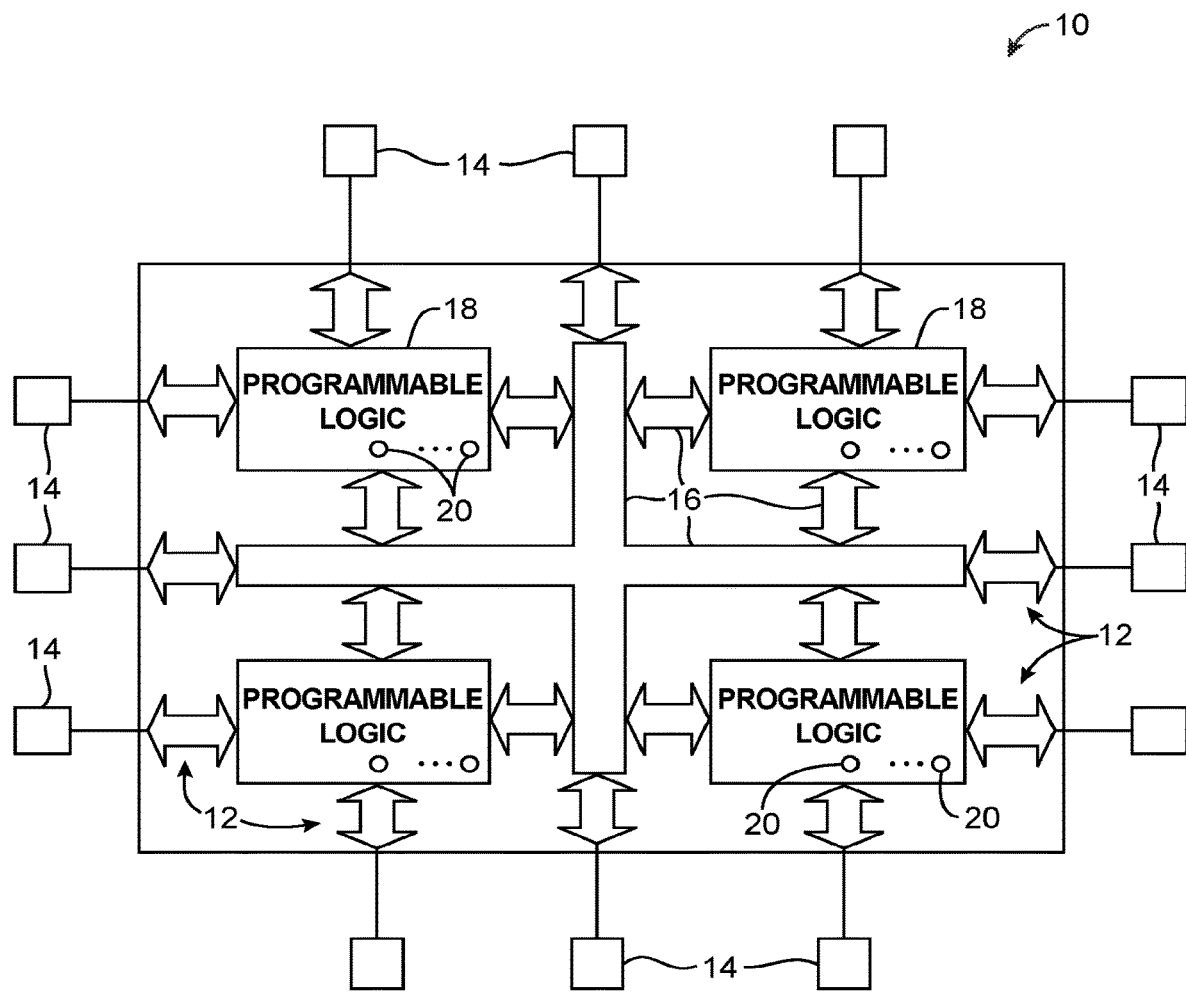
FIG. 2 is a diagram of an illustrative programmable integrated circuit in accordance with an embodiment.

In accordance with an embodiment, an integrated circuit may be a programmable integrated circuit such as programmable integrated circuit 10 of FIG. 2. Programmable integrated circuit 10 may be configured to implement a variety of different functions and may therefore benefit from interface circuitry that is capable of supporting different communications protocols and data rates.

As shown in FIG. 2, integrated circuit 10 may contain memory elements 20. Memory elements 20 may be loaded with configuration data to configure programmable transistors such as pass transistors (sometimes referred to as pass gates or pass gate transistors) in programmable circuitry such as programmable logic 18.

Because memory elements 20 may be used in storing configuration data for programmable logic 18, memory elements 20 may sometimes be referred to as configuration random-access memory (CRAM) cells. Integrated circuit 10 may be configured to implement custom logic functions by configuring programmable logic 18. As a result, integrated circuit 10 may sometimes be referred to as a programmable integrated circuit or a programmable logic device (PLD) integrated circuit.

As shown in FIG. 1, programmable integrated circuit 10 may have input-output (I/O) circuitry 12 for driving signals off of device 10 and for receiving signals from other devices via input-output pins 14. Interconnection resources 16 such as global and local vertical and horizontal conductive lines and buses may be used to route signals on device 10. Interconnection resources 16 may include fixed interconnects (conductive lines) and programmable interconnects (i.e., programmable connections between respective fixed interconnects).

Figure 3:
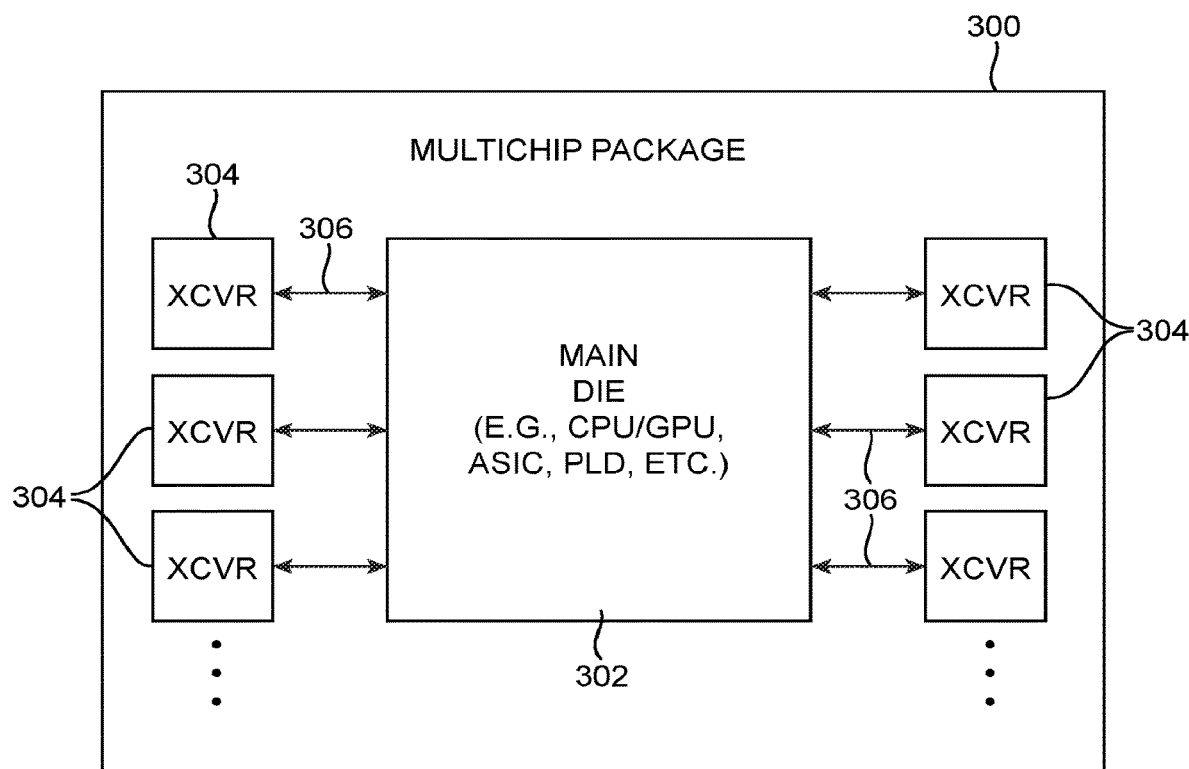
FIG. 3 is a top view of an illustrative multichip package that includes a main die coupled to multiple transceiver daughter dies in accordance with an embodiment.

A key challenge in designing programmable integrated circuits is the need to provide flexibility while providing high-speed connectivity between devices. In an effort to meet this demand, a heterogeneous multichip package such as package 300 is provided that decouples the transceiver components from the core logic fabric die (see, e.g., FIG. 3). As shown in FIG. 3, multichip package 300 includes a main die 302 that includes the core logic circuitry and multiple transceiver (XCVR) dies 304 that are coupled to main die 302 via interconnect paths 306. In general, main die 302 may be a programmable integrated circuit such as a programmable logic device, a central processing unit (CPU), a graphics processing unit (GPU), an ASIC, or other suitable integrated circuit. Main die 302 may be coupled to any number of transceiver dies 304 within package 300.

Configured in this way, transceiver dies 304 and main die 302 need not be manufactured on the same process node, which enables an in-package integration scheme that is easily scalable and allows designers to quickly mix-and-match components from different process nodes that best suit customers' need. Using separate proven transceiver dies 304 rather than on-chip transceivers can also help significantly reduce validation and bring-up times and dramatically improve customers' time-to-market metrics. Transceiver dies 304 may each be a hard IP (intellectual property) block that is capable of supporting communications protocols including but not limited to current and future versions of Ethernet, Interlaken, PCIe, IEEE 1588, CPRI (Common Public Radio Interface), etc.

Figure 4:
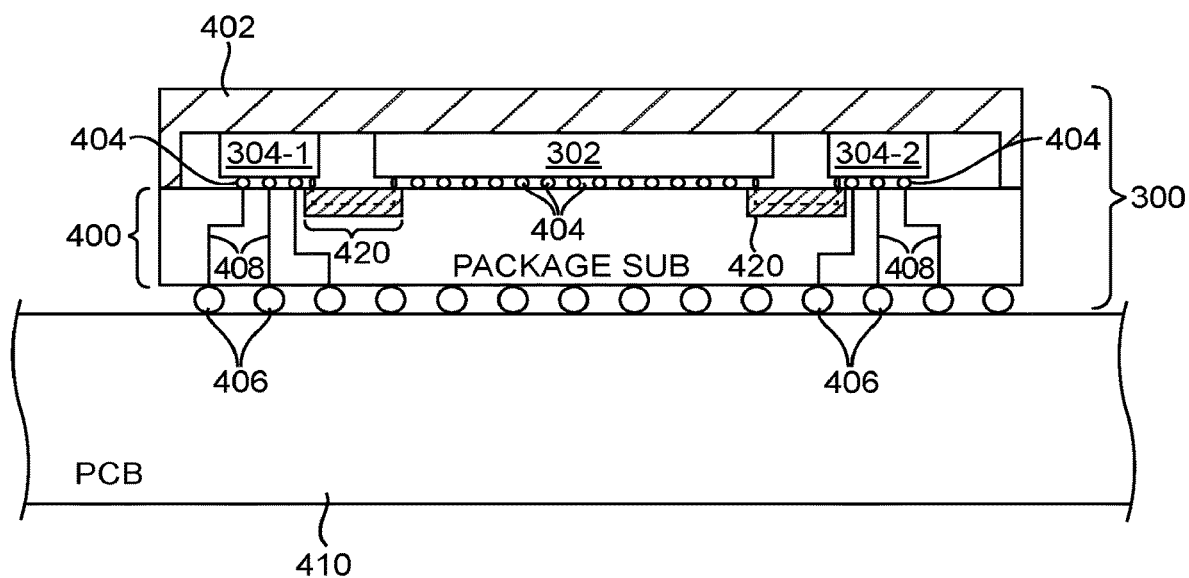
FIG. 4 is a cross-sectional side view of an illustrative multichip package that includes a main die coupled to multiple transceiver daughter dies via embedded package interconnect structures in accordance with an embodiment.

FIG. 4 shows a cross-sectional side of an exemplary multichip package 300 of the type described in connection with FIG. 3. As shown in FIG. 4, package 300 may include a substrate 400, main die 302 mounted on substrate 400, at least first and second auxiliary or "daughter" dies 304-1 and 304-2 mounted on substrate 400, and a package lid 402 that covers and protects package 300. Flip-chip (otherwise known as controlled collapse chip connection or "C4") bumps 404 may be formed between substrate 400 and the various dies 302 and 304 mounted on substrate 400. An array of solder balls 406 (sometimes referred to collectively as a ball grid array or "BGA") may be formed at the bottom surface of package substrate 400. Package 300 formed in this way may then be mounted on a printed circuit board (PCB) 410 to communicate with other devices in the system.

Daughter dies 304-1 and 304-2 (e.g., transceiver IP blocks described in connection with FIG. 3, memory blocks, CPUs, etc.) may be routed to solder balls 406 via standard package traces 408. In accordance with an embodiment, main die 302 may communicate with daughter dies 304 using an Embedded Multi-die Interconnect Bridge (EMIB) solution that is designed and patented by INTEL Corporation. As shown in FIG. 4, EMIB 420 is a small silicon chip that is embedded in the underlying package substrate 400 and offers dedicated ultra-high-density interconnection between dies within multichip package 300. The EMIBs 420 generally include short wires, which help to significantly reduce loading at output drivers and directly boost performance. This solution may be advantageous over other multichip packaging schemes that use a silicon interposer, which is prone to issues such as warpage and requires a large number of microbumps and through-silicon vias (TSVs) to be formed within the interposer, thereby reducing overall yield and increasing manufacturing complexity and cost. The number of dies that can be integrated using an interposer is also limited compared to that supported by the EMIB technology.

Each EMIB 420 may include wires that collectively serve as a bus that includes one or more channels between main die 302 and a corresponding daughter die 304. One constraint of EMIBs is that the number of EMIB microbumps is limited (sometimes to only one edge of the substrate), and it is within this context that the embodiments of the invention arise.

Figure 5:
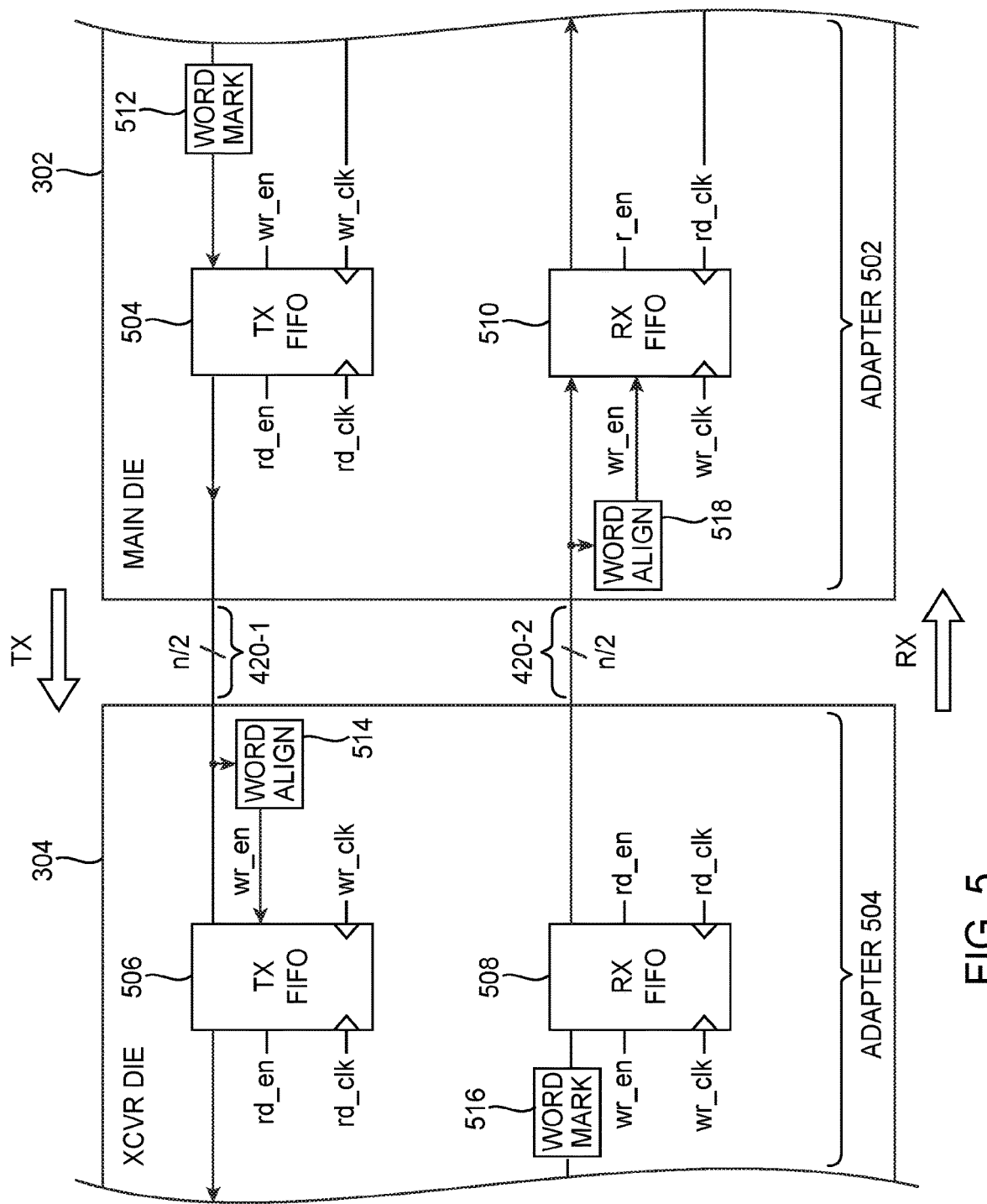
FIG. 5 is a diagram showing adapter circuitry that can be used to support a variety of different communications protocols in a multichip package in accordance with an embodiment.

FIG. 5 is a diagram that shows circuitry associated with a single EMIB channel. In general, each daughter die 304 may communicate with main die 302 over any suitable number of channels (e.g., via 10 or more channels, via 20 or more channels, via 50 or more channels, etc.).

Each channel may include interconnect paths for carrying different types of data. For example, a first group of interconnect paths may be used to convey asynchronous serial data, whereas a second group of interconnect paths may be used to convey time-domain-multiplexed (TDM) memory mapped data for programming the main die. FIG. 5 shows only a third group of interconnect paths 420, which are used to convey source synchronous data. Paths 420 are therefore sometimes referred to here as synchronous data paths in which clock and data travel in the same direction.

There may only be a limited number of synchronous data paths 420 available between dies 302 and 304 in each channel. Consider a scenario in which only n synchronous data paths 420 are available between dies 302 and 304 per channel, n/2 data paths 420-1 may be apportioned to transmit data from main die 302 to daughter die 304 while n/2 data paths 420-1 may be apportioned to receive data from daughter die 304 at main die 302. For example, if each channel includes only eighty available pins dedicated to source synchronous data transfer, a first group of forty pins may be used by the transmit (TX) paths 420-1 whereas a second group of forty pins may be used by the receive (RX) paths 420-2.

Still referring to FIG. 5, main die 302 may include adapter circuitry 502 that selectively provides data compression. Main die adapter circuitry 502 may include a transmit FIFO (first-in first-out) circuit 504, word marking logic 512 associated with the transmit FIFO 504, a receive FIFO circuit 510, and word alignment logic 518 associated with the receive FIFO 510. Transmit FIFO 504 and receive FIFO 510 are configured to buffer outgoing and incoming data, respectively, and are each controlled by a write enable signal wr_en, a read enable signal rd_en, a write clock signal wr_clk, and a read clock signal rd_clk. The write clock for TX FIFO 504 may be a first system clock that is provided from the core region of main die 302, whereas the read clock for RX FIFO 504 may be a second system clock that is provide from the core region of main die 302. The first and second system clocks may be the same clock or may be different clock signals. In accordance with an embodiment, FIFO 504 may be operated in a first "1×" mode, where signals rd_clk and wr_clk exhibit the same frequency. Since the read and write clock frequencies are identical, the data width at the input and output of FIFO 504 are both set at n/2 in the 1× mode.

In scenarios where the data width at the input of FIFO 504 needs to be greater than n/2, FIFO 504 may be operated in a second "2×" mode, where signal rd_clk exhibits twice the frequency of signal wr_clk. Configured in this way, the data width at the input of FIFO 504 is doubled to n, so the data width across paths 420-1 is effectively cut in half relative to the data width at the input of FIFO 504. The use of a read clock signal rd_clk running at double the corresponding write clock signal effectively configures FIFO 504 to compress the outgoing data since only half of the data is transferred across paths 420-1 per 2× clock cycle.

Similarly, RX FIFO 510 may be operated in the 1× mode, where signals rd_clk and wr_clk exhibit the same frequency. Since the read and write clock frequencies are identical, the data width at the input and output of FIFO 510 are both set at n/2 in the 1× mode.

In scenarios where the data width at the output of FIFO 510 needs to be greater than n/2, FIFO 510 may be operated in the 2× mode, where signal wr_clk exhibits twice the frequency of signal rd_clk. Configured in this way, the data width at the output of FIFO 510 is doubled to n, so the data width across paths 420-2 is effectively cut in half relative to the data width at the output of FIFO 510. The use of write clock signal wr_clk running at double the corresponding read clock signal rd_clk effectively configures FIFO 510 to decompress the incoming data stream since only half of the data is transferred across paths 420-2 per 2× clock cycle.

When adapter circuitry 502 is operated in the 2× mode (i.e., whenever FIFOs 504 and 510 are transmitting only half of the data word per 2× clock cycle), boundary alignment should be engaged by activating word marking logic 512 and word alignment logic 518. Word marking logic 512, which may be inserted at the data input of TX FIFO 504, may append a first additional bit that marks the lower half of an original word to be transmitted and may add a second additional bit that marks the upper half of the original word. Word alignment logic 518, which may be inserted at the write enable input of TX FIFO 510, may then analyze the incoming data stream and reassemble the upper and lower halves together to recreate the original word. Boundary alignment may therefore be used to support 2:1 data compression. Operated in this way, data may be properly transmitted across paths 420 without requiring any training sequence and without adding any latency.

Similarly, daughter die adapter circuitry 504 may include a receive FIFO 508 coupled to paths 420-2, word marking logic 516 associated with RX FIFO 508, a transmit FIFO 506 coupled to paths 420-1, and word alignment logic 514 associated with the receive FIFO 506. FIFO 506 is referred to herein as a "transmit" FIFO because it is used in the transmit path from the perspective of the main die 302. Form the point of view of the daughter die, however, FIFO 506 can sometimes be considered an RX FIFO. Similarly, FIFO 508 is referred to herein as a "receive" FIFO because it is used in the receive path from the perspective of the main die 302. Form the point of view of the daughter die, however, FIFO 508 can sometimes be considered a TX FIFO.

FIFOs 506 and 508 are each controlled by a write enable signal wr_en, a read enable signal rd_en, a write clock signal wr_clk, and a read clock signal rd_clk. Similar to that described in connection with adapter circuitry 502, FIFOs 506 and 508 within adapter circuitry 504 may also be configured in 1× mode and 2× mode to selectively compress/decompress data while engaging boundary alignment only during the 2× mode (e.g., by activating word alignment logic 514 and word marking logic 516).

Figures 6, 7:
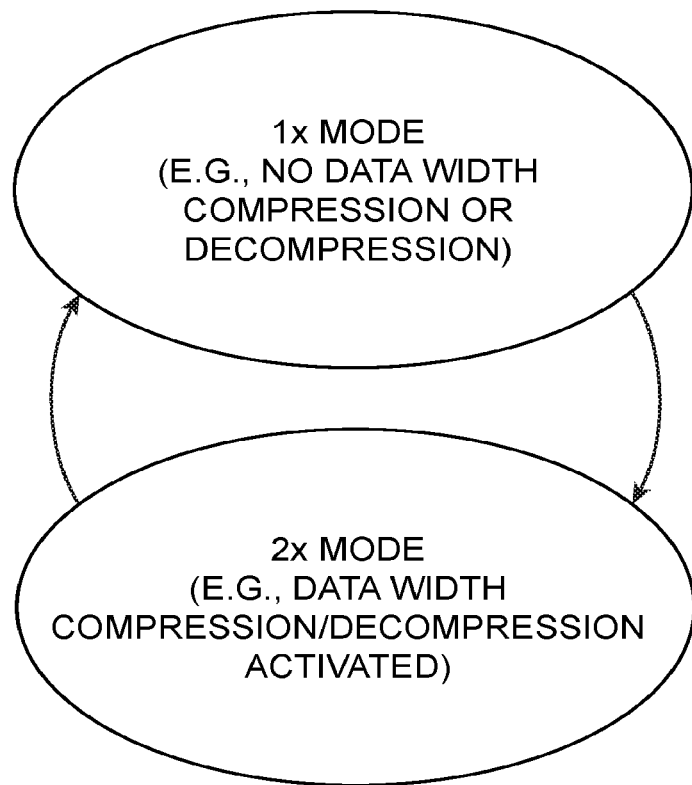
FIG. 6 is a diagram showing how the adapter circuitry of FIG. 5 can be used to support multiple data widths in accordance with an embodiment.
FIG. 7 is a diagram showing different configuration modes in which first-in first-out (FIFO) circuits in the adapter circuitry of FIG. 5 can be operated in accordance with an embodiment.

FIG. 6 shows how each FIFO circuit in circuitry 502 and 504 may be operated in at least the 1× mode or 2× mode. When operated in the 1× mode, there is no data width (de)compression, and the FIFO circuit conveys "single" data width n/2 at both its input and output. When operated in the 2× mode, the FIFO circuit either exhibits: (1) double data width n at its input and single data width n/2 at its output to provide compression; or (2) single data width n/2 at its input and "double" data width n at its output to provide decompression. The two modes therefore provide a flexible data width as far as the core logic on the main die is concerned, which allows the EMIB interface-which includes only a fixed number of pins- to support a variety of different communications protocols.

The 1× and 2× modes allow each FIFO circuit to provide a configurable data width. Depending on the position of the FIFO and the relationship of the read and write clock signals that are currently being used to control that FIFO, each FIFO may further be configured in one of at least four different modes:

(1) a phase-compensation mode;
(2) a clock-compensation mode;
(3) an elastic mode; and
(4) a register mode.

See, e.g., FIG. 7. A FIFO circuit may be configured in the phase-compensation mode when the read and write clock signals controlling that FIFO are generated based on the same clock source so that both clocks either have the same frequency or one clock has a frequency that is an integer multiple of the other. In either scenario, the two clocks may have any mismatched phases, so the FIFO will compensate for the phase offset and ensure synchronous data transfer.

The FIFO circuit may be configured in the clock-compensation mode when the read and write clock signals controlling that FIFO are generated based off different clock sources. In this mode, the two clock signals generally exhibit different clock frequencies, so the FIFO will compensate for the rate difference by opportunistically inserting or deleting idle symbols (as an example).

The FIFO circuit may also be configured in the elastic mode when the read and write clock signals controlling that FIFO exhibit substantially different frequencies such that the FIFO might be subject to overflow or underflow. In this mode, the FIFO may throttle its write when it is almost full (i.e., by deactivating control signal wr_en) to allow the read port to catch up or may throttle its read when it is almost empty (i.e., by deasserting control signal rd_en) to allow the write port to catch up. Operated in this way, the elastic mode is similar to the clock-compensation mode with an additional data throttling functionality.

The FIFO circuit may also be configured in the register mode when it is desired to completely bypass that FIFO. The elastic mode should only be used when the FIFO is operated in the 1× mode. Configured in this way, the FIFO circuit provides low latency, which can help ameliorate potential timing closure issues that may arise when supporting certain communications protocols.

Figure 8:
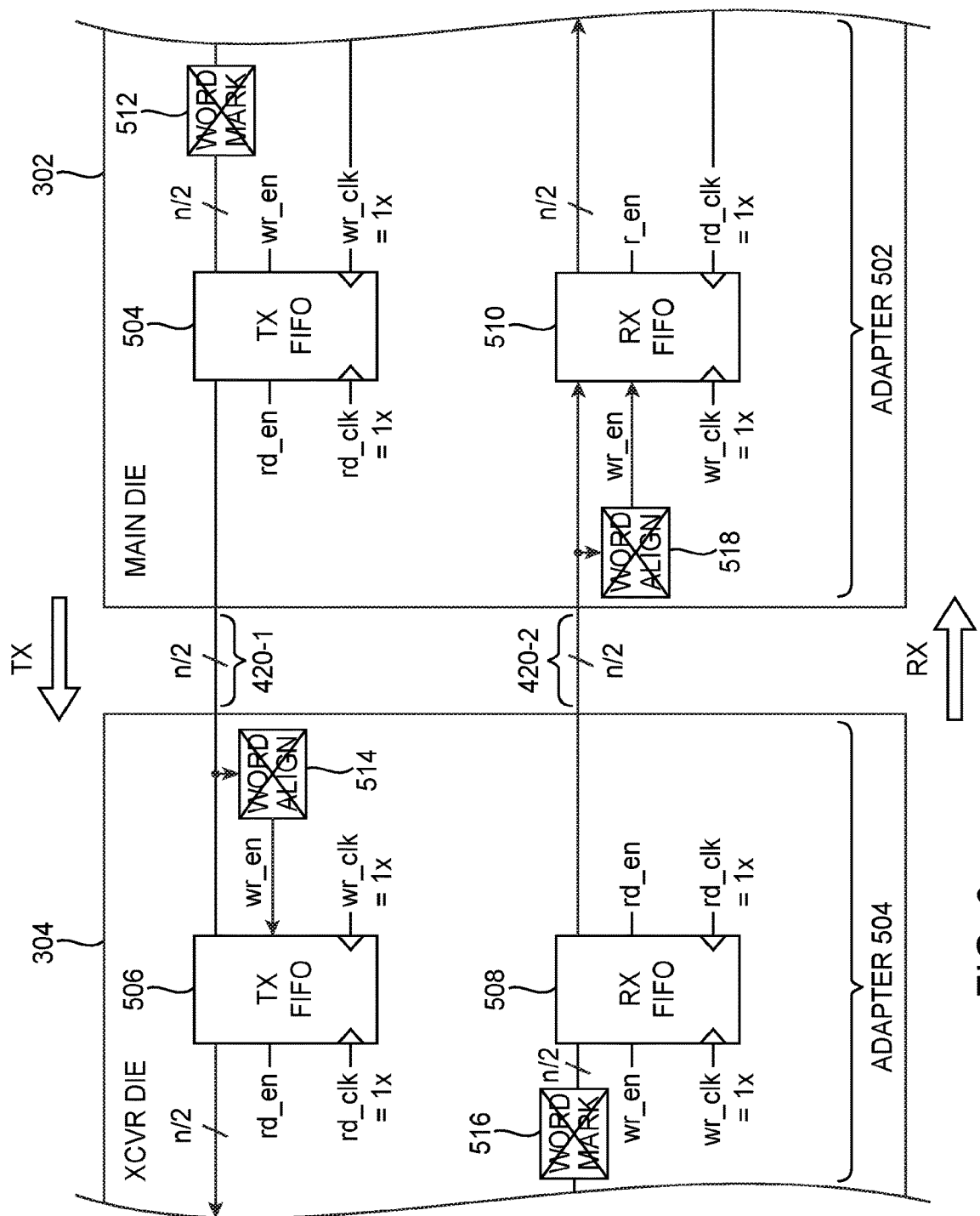
FIG. 8 is a diagram showing how the adapter circuitry of FIG. 5 can be used to support 1× mode in accordance with an embodiment.

FIG. 8 is a diagram showing adapter circuitry 502 and 504 of FIG. 5 operated in 1× mode in accordance with an embodiment. As shown in FIG. 8, the read and write clock signals are all "1×" clock signals. In other words, all the FIFOs are running at the system clock speed. As described above, the boundary alignment circuitry (e.g., the work marking and word alignment logic circuitry) is deactivated, as indicated by the "X" through each of the respective blocks, and the data width throughout the adapter circuitry is maintained at n/2.

Generally in such scenarios, each of the FIFOs may be configured in the phase-compensation mode, but FIFOs 504 and 510 may optionally be configured in the elastic mode. In yet other suitable arrangements, FIFOs 504, 508, and/or 510 may optionally be placed in the register bypass mode to reduce latency.

Figure 9:
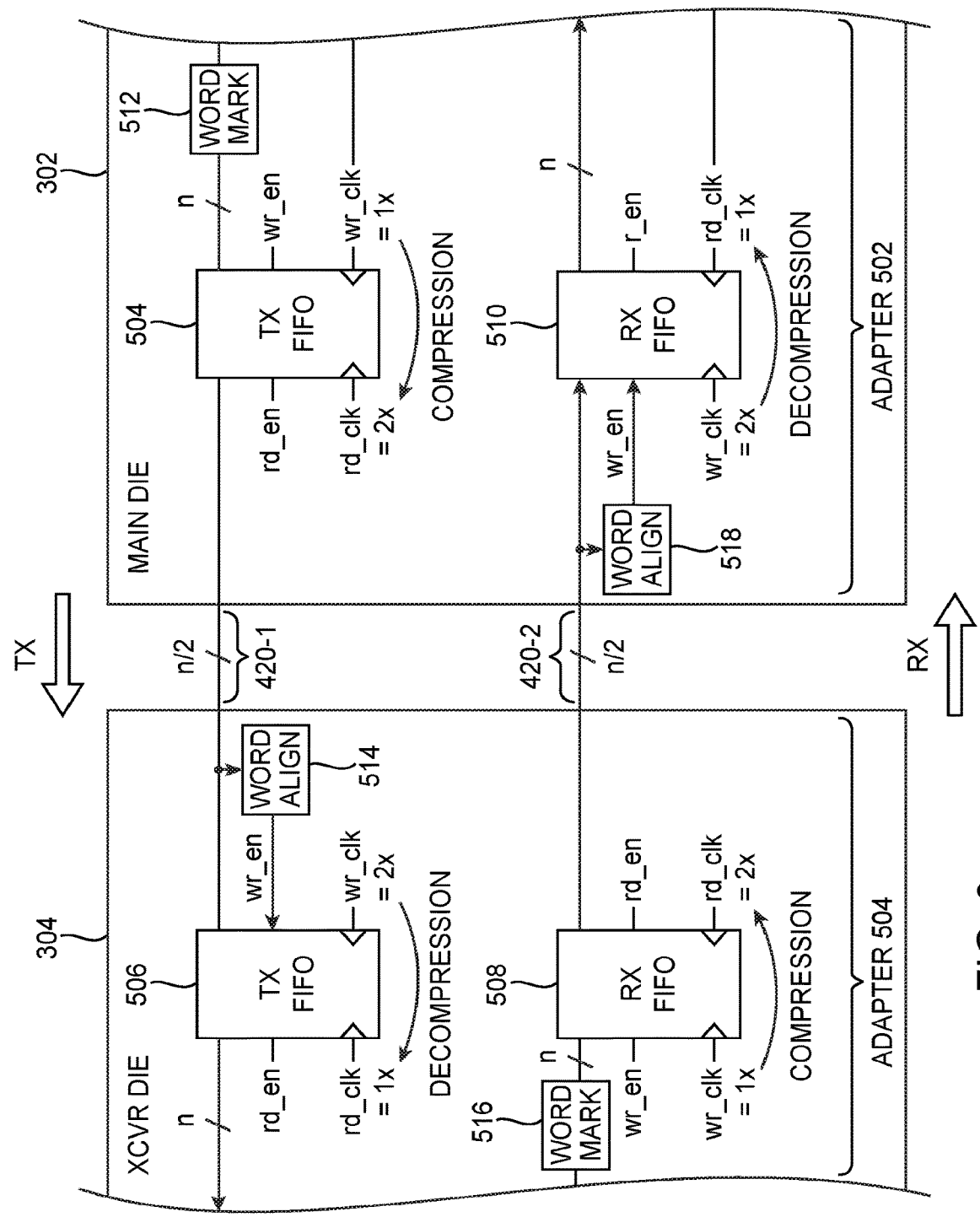
FIG. 9 is a diagram showing how the adapter circuitry of FIG. 5 can be used to support 2× mode in accordance with an embodiment.

FIG. 9 is a diagram showing how adapter circuitry 502 and 504 of FIG. 5 operated in 2× mode in accordance with another embodiment. As shown in FIG. 9, FIFOs 504 and 508 are providing data compression (i.e., the read clock is double the corresponding write clock) while FIFOs 506 and 510 are providing data decompression (i.e., the read clock is half the corresponding write clock). As described above, the boundary alignment circuitry (e.g., the work marking and word alignment logic circuitry) may be activated so that the data width to the external environment is doubled to n while the data width across the EMIB remains at n/2.

As an example, each of FIFOs 504, 506, 508, and 510 may all be configured in the phase-compensation mode to support the PCIe standard such as the PCIe 3.0 and 4.0 and beyond.

As another example, each of FIFOs 504, 506, and 508 may be configured in the phase-compensation mode while FIFO 510 is configured in the clock-compensation mode to support the 10 Gigabit Ethernet (10GE) technologies. When supporting the 10G BaseR interconnect, for example, FIFO circuit 510 may be configured in the clock-compensation mode since FIFO 510 receives a write clock that is provided from transceiver die 304 and a read clock that is provided as a system clock from the core region of main die 302.

As yet another example, each of FIFOs 506 and 508 may be configured in the phase-compensation mode while FIFOs 504 and 510 are configured in the elastic mode to support the Interlaken networking protocol. Since the Interlaken protocol allows the system clock to be overclocked, FIFO 504 may throttle incoming data by controlling the write enable signal wr_en to prevent overflow while FIFO 510 may throttle its output by controlling the read enable signal rd_en to prevent underflow.

Figure 10:
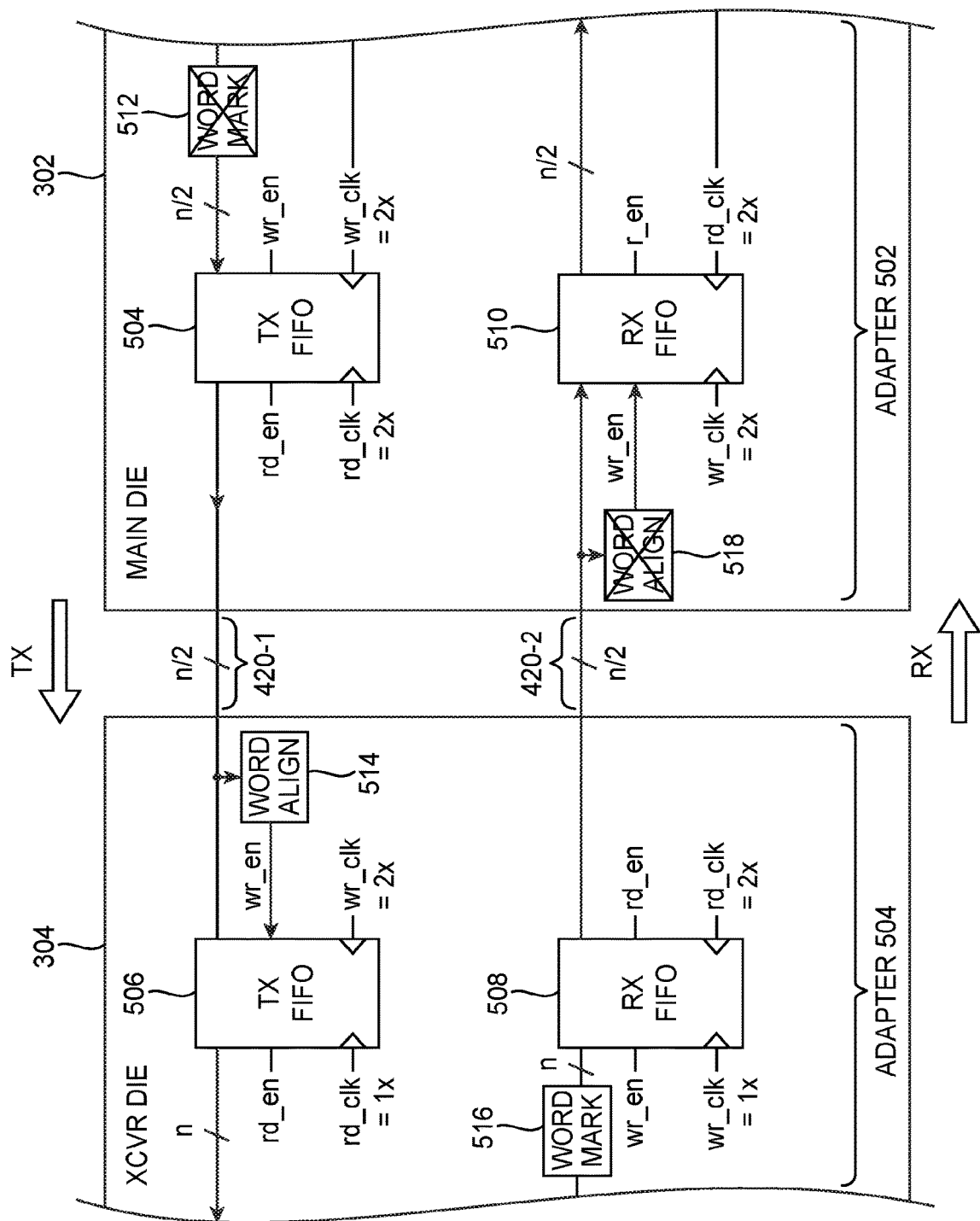
FIG. 10 is a diagram showing how the adapter circuitry of FIG. 5 can be used to support a hybrid 1×/2× mode in accordance with an embodiment.

FIG. 10 is a diagram showing how adapter circuitry 502 and 504 of FIG. 5 can be used to support a hybrid 1×/2× mode in accordance with an embodiment. As shown in FIG. 10, adapter circuitry 502 may be operated in "1×" mode (even though the read and write clocks are both at the 2× clock rate), whereas adapter circuitry 504 may be operated in 2× mode. Boundary alignment on transceiver die 304 may be switched in to use, whereas boundary alignment on main die 302 may be bypassed (as indicated by the "X" marked through blocks 512 and 518). Configured in this way, main die 302 runs entirely at the 2× clock rate at half (or "single") data width n/2 while daughter die 304 connects to the EMIB at the 2× clock rate but interfaces with external off-package components at the 1× clock rate at full (or "double") data width n.

Figure 11:
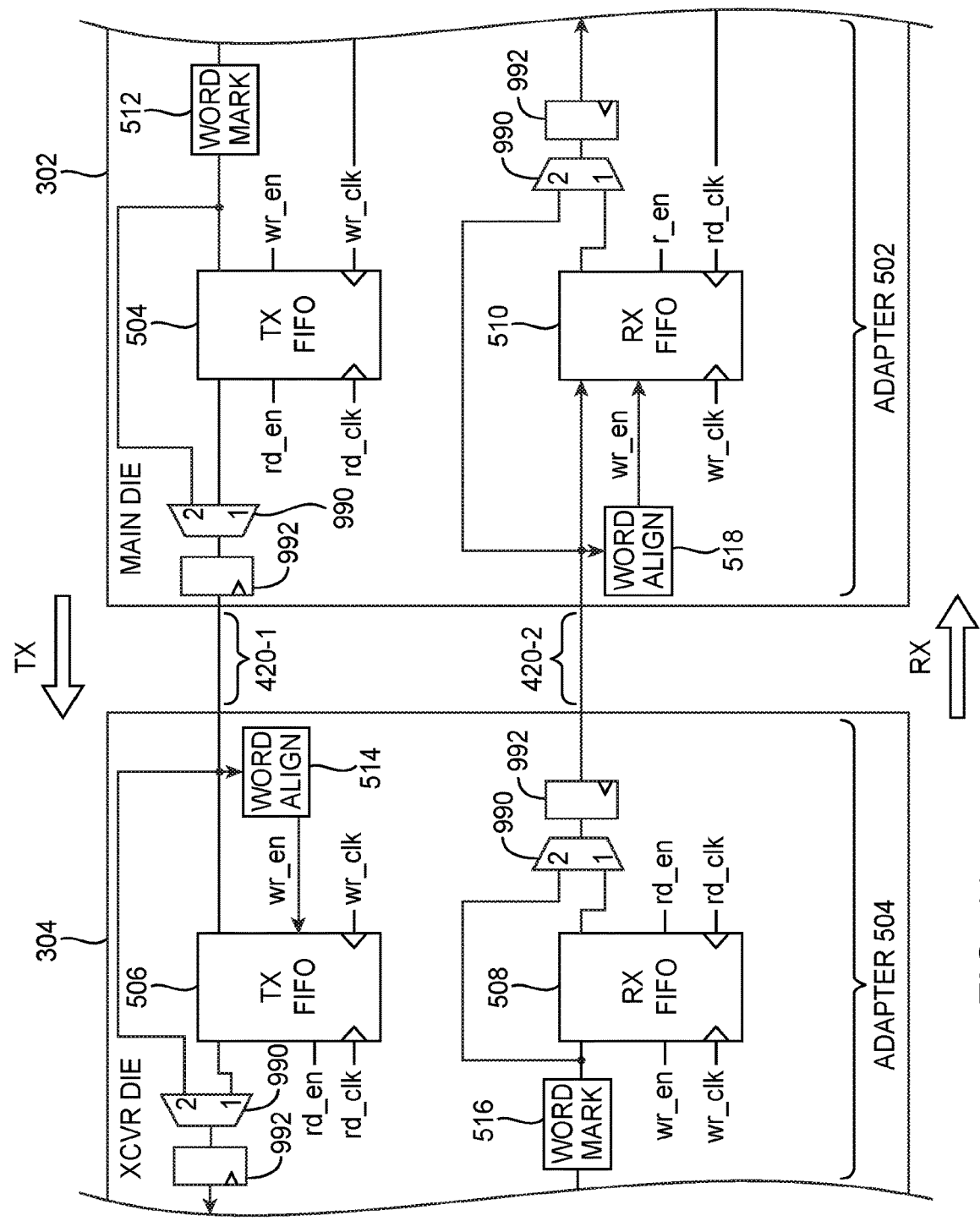
FIG. 11 is a diagram showing how the adapter circuitry of FIG. 5 can be used to support register mode in accordance with an embodiment.

FIG. 11 is a diagram showing how adapter circuitry 502 and 504 of FIG. 5 can be implemented to support register mode in accordance with another embodiment. As shown in FIG. 11, a multiplexer 990 and a latch 992 (e.g., a digital flip-flop) may be inserted at the output of each FIFO in adapter circuitry 502 and adapter circuitry 504. In particular, multiplexer 990 may have a first input that is coupled to the data output of the associate FIFO, a second input that is coupled to the data input of the associated FIFO, and an output that is coupled to a corresponding latch 992.

When register mode is deactivated, each multiplexer 990 may be configured to route signals from its first input to its output. When register mode is engaged, each multiplexer 990 may be configured to route signals from its second input to its output. Configured as such, multiplexer 990 effectively bypasses the associated FIFO. In register mode, the boundary alignment circuitry is also switched out of use.

Although not explicitly shown, the embodiments of FIGS. 5 and 8-10 may also include multiplexers 990 and latches 992 to support the register mode. If desired, at least one of FIFOs 504, 508, and 510 may be configured in register mode during the 1× mode of FIG. 8. In another suitable embodiment, at least one of FIFOs 504 and 510 may be configured in register mode during the hybrid mode of FIG. 10.

The examples described herein related to 2:1 data (de) compression is merely illustrative and does not serve to limit the scope of the present invention. In general, the circuitry and techniques described above in connection with FIGS. 1-11 may be applied to higher compression schemes including but not limited to 4× compression schemes, 8× compression schemes, etc. In such applications, a phase-locked loop or other clock generation circuitry may be configured to generate 1×, 2×, 4×, and/or 8× clock signals.

The foregoing is merely illustrative of the principles of this invention and various modifications can be made by those skilled in the art. The foregoing embodiments may be implemented individually or in any combination.

What is claimed is:

1. A system comprising:
a first die of a first single package multi-die device having first input/output circuitry; and
a second die of the first single package multi-die device communicatively coupled to the first die, wherein the second die comprises second input/output circuitry configurable to operate in:
a first mode in which a read clock frequency or a write clock frequency is a first frequency; and
a second mode in which the read clock frequency or the write clock frequency is a second frequency that is different than the first frequency.

2. The system of claim 1, wherein the second frequency is double the first frequency.

3. The system of claim 1, wherein the first input/output circuitry is configurable to operate in the first mode and the second mode.

4. The system of claim 1, comprising a second single package multi-die device having a third die, wherein the third die comprises third input/output circuitry and is communicatively coupled to the second die.

5. The system of claim 1, wherein:
in the first mode, the write clock frequency is the first frequency; and
in the second mode, the write clock frequency is the second frequency.

6. The system of claim 1, wherein:
in the first mode, the read clock frequency is the first frequency; and
in the second mode, the read clock frequency is the second frequency.

7. The system of claim 1, wherein the second die comprises an integrated circuit die.

8. The system of claim 7, wherein:
the integrated circuit die is a first processor die; and
the first die is a second processor die.

9. The system of claim 7, wherein:
the integrated circuit die comprises programmable logic; and
the first die is a transceiver die.

10. A single package multi-die electronic device, comprising:
a first die of the single package multi-die electronic device, wherein the first die comprises first input/output circuitry; and
a second die of the single package multi-die electronic device communicatively coupled to the first die, wherein the second die comprises second input/output circuitry configurable to operate in:
a first mode in which a read clock frequency or a write clock frequency is a first frequency; and
a second mode in which the read clock frequency or the write clock frequency is a second frequency that is different than the first frequency.

11. The single package multi-die electronic device of claim 10, wherein the second die is configurable to switch between operating in the first and second modes.

12. The single package multi-die electronic device of claim 10, wherein the second die comprises programmable logic.

13. The single package multi-die electronic device of claim 10, wherein the first die is communicatively coupled to the second die via the first input/output circuitry.

14. The single package multi-die electronic device of claim 10, comprising:
a third die having third input/output circuitry configurable to operate in the first mode and the second mode; and
a fourth die having fourth input/output circuitry configurable to operate in the first mode and the second mode.

15. The single package multi-die electronic device of claim 10, wherein:
the second input/output circuitry is configurable to operate in the first mode and the second mode; and
the first input/output circuitry and the second input/output circuitry are configurable to simultaneously operate in the first mode.

16. The single package multi-die electronic device of claim 10, wherein:
the read clock frequency corresponds to a frequency of a read clock signal;
the write clock frequency corresponds to a frequency of a write clock signal; and
the read clock signal and the write clock signal are generated based on the same clock source.

17. The single package multi-die electronic device of claim 10, wherein the second frequency is double the first frequency.

18. A single package multi-die electronic device, comprising:
a first die of the single package multi-die electronic device, wherein the first die comprises first input/output circuitry;
a second die of the single package multi-die electronic device communicatively coupled to the first die, wherein the second die comprises second input/output circuitry configurable to operate in:
a first mode in which a read clock frequency or a write clock frequency is a first frequency; and
a second mode in which the read clock frequency or the write clock frequency is a second frequency that is different than the first frequency; and
a third die of the single package multi-die electronic device, wherein the third die comprises third input/output circuitry.

19. The single package multi-die electronic device of claim 18, wherein:
in the first mode, the write clock frequency is the first frequency; and
in the second mode, the write clock frequency is the second frequency.

20. The single package multi-die electronic device of claim 18, wherein:
in the first mode, the read clock frequency is the first frequency; and
in the second mode, the read clock frequency is the second frequency.

* * * * *